United States Patent Office 3,813,298
Patented May 28, 1974

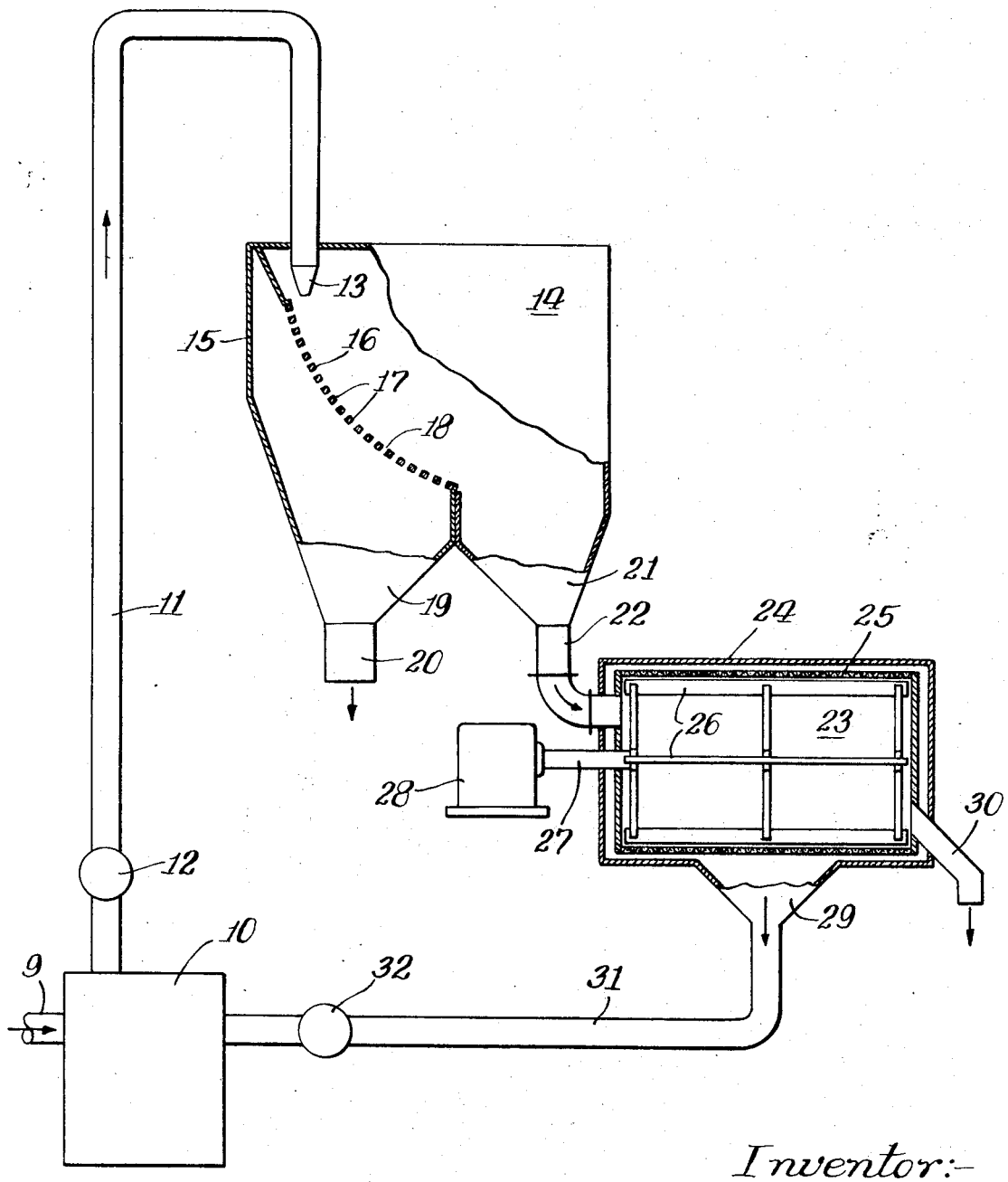

3,813,298
DUAL SCREENING PROCESS FOR SEPARATING STARCH PARTICLES AND FIBERS
Vincent P. Chwalek, 300 N. State St., Chicago, Ill. 60610
Continuation-in-part of abandoned application Ser. No. 99,486, Dec. 18, 1970. This application Apr. 27, 1973, Ser. No. 355,248
Int. Cl. C13l 1/00
U.S. Cl. 127—69       8 Claims

ABSTRACT OF THE DISCLOSURE

A continuous process for separating starch particles and fibers from an aqueous slurry containing said particles and fibers suspended therein which comprises: (1) passing a supply stream of said slurry over a screen bend having a slot width of such dimensions that a separation of starch from fiber is effected to obtain a first fraction comprising an aqueous slurry containing a major portion of the starch particles and which is substantially free of fiber, and a second fraction comprising an aqueous slurry containing in suspension, therein substantially all the fiber and a minor portion of the starch particles; (2) separating the second fraction into two components by centrifugally forcing said second fraction against a screen having openings of a dimension such that an aqueous component containing starch and fine fiber is separated from the fiber; (3) continuously recycling the aqueous component containing starch and fine fiber of step (2) to the supply stream of step (1); (4) recovering the first fraction of step (1) and the fiber separated in step (2).

RELATED APPLICATIONS

This application is a continuation-in-part of application Ser. No. 99,486, filed Dec. 18, 1970, now abandoned.

BACKGROUND OF THE INVENTION

(1) Field of the invention

The invention relates to a process for continuously separating starch and fiber particles.

(2) The prior art

A great variety of devices are known which are capable of separating solid particles from a liquid or a suspension and for separating solid particles of different sizes. Fixed screens are frequently used for separating coarse materials, such as those encountered in ore washeries. For separating fine-sized products, however, fixed or stationary screens present many difficulties, including frequent clogging and low efficiency. To overcome these difficulties in separating fine-sized products, moving screens such as shaking screens, vibrating screens, and rotary screens are extensively employed.

While moving screens have been quite successful in the separation of fine-sized particles, such screens are subject to considerable wear. Heavy and complicated equipment is often required to subject large sieving surfaces into sufficient motion to effect good separation of fine particles. Separation of fine-sized matter without the use of moving screens was improved by the development of the sieve bend or screen bend.

The screen bend typically consists of a curved bar screen, wherein the bars have a generally rectangular or trapezoidal cross-section and form the generatrices of a cylindrical surface. To effect a separation of fine particles from coarser matter, a liquid slurry of the particles and coarse matter are washed down the concave surface of the screen. Fine particles and liquid pass through the separating apertures or slits between the bars, while coarser material passes over the screen into a receiving receptacle. The structural and operational details of a screen bend are fully described in U.S. Pat. 2,916,142. The accurate separation of solid particles suspended in a liquid medium which can be effected by the use of these screen bends has resulted in widespread success of this separating device.

In the starch industry, starch is generally obtained by grinding a starch bearing material, for example, corn, potato, cassava root and the like, to form a mixture of starch and fiber, generally in an aqueous medium, and separating the starch from the fiber. Since the starch particles are smaller in size (50 microns or less) than the fiber particles, the separation can be accomplished by screening.

It has been disclosed, for example, that screen bends can be used for washing out starch and gluten granules from a mixture of such granules and fiber obtained from ground starch bearing materials. In such processes, the screen bends used have apertures which will pass the starch and gluten granules. As a result, the relatively small starch and gluten fraction (often referred to as the underflow) passes through the apertures of the screen bend, while the coarser fibrous material (often referred to as the overflow) is washed over the screen and is thereby separated.

A known advantage of the screen bend is that it can provide a very sharp separation. For example, a screen bend that passes particles 50 microns or smaller will pass very few particles larger than 50 microns. Employing screen bends in a process for obtaining starch, therefore, can be very desirable because starch substantially uncontaminated with fiber can be obtained.

Generally, a single pass of liquid slurry of starch and fiber over the screen bend will not quantitatively separate the starch from the fiber. Several successive screening operations are required to substantially separate the starch and fiber, and a variety of processes involving successive screenings have been proposed. For example, U.S. Pat. 2,974,068 discloses a process for separating starch from fiber involving screen bends in series with hydroclones. U.S. Pat. 3,079,287 discloses a process of separating starch from fiber involving several screen bends in series. In addition, this patent discloses that the publication "Das Bogensieb und seine Anwendung in der Stärkeindustrie," Die Stärke, 10 (1958), No. 11, pp. 277–284 describes a process for preparing potato-starch, in which a coarse screening of grated potato pulp is effected in a first screening station by means of centrifugal screens, and a fine screening is subsequently carried out in a second screening station on sieve bends.

As the latter publication indicates, it was known prior to this invention that centrifugal screens could be used to separate starch and fiber, and that centrifugal screens could be used in combination with screen bends.

The well-known disadvantage of centrifugal screen, however, is that centrifugal screens do not effect a sharp separation of starch and fiber particles. The centrifugal force involved apparently forces flexible fine fiber particles through the screen, so that, quite generally, starch separated with a centrifugal screen is contaminated with fine fiber particles.

Screen bends also have a disadvantage. To effect the separation of starch and gluten from the fiber using screen bends, a liberal amount of water must be used. Because of this liberal water requirement, the two fractions obtained are relatively low in solids content. It is often desirable in the starch industry to reduce the water content of the coarse fiber fraction to aid further processing. The removal of large quantities of water from the product requires large amounts of energy and is a disadvantage inherent in the use of the screen bend in a starch separation process.

As disclosed hereinafter, in order to reduce the amount of water in the coarse fiber overflow fraction obtained from starch separation on a screen bend, centrifugal screen separators can be used, for example, known centrifugal separators consisting of a cylindrical bar screen in which an impeller is rotated at high speed, thereby forcing a portion of the liquid slurry through the screen. The coarse matter which is unable to pass through the screen is expelled at an open end of the screen and has a reduced liquid content when compared with that of the feed stream. The liquid removed from the coarse fiber in this manner will contain a significant amount of starch granules which were not removed in the screen bend and, because the centrifugal separator cannot effect a sharp separation, a significant amount of fine fiber particles, i.e., particles having a size up to 105 microns, or more. The liquid obtained by centrifugal de-watering of fiber from a screen bend can be appropriately designated as an intermediate fraction, i.e., it contains starch particles and fine fiber particles (often termed residue). The starch contained in such an intermediate fraction is economically important and cannot be ignored, but the separation can be difficult. U.S. Pat. 2,974,068 discloses a process for separating an intermediate friction of starch and fine fiber particles by settling rates and hydroclones. Such a process, however, can be cumbersome.

In summary, it was known in the prior art that a screen bend could be employed to separate starch and fiber particles, and centrifugal separators were known which could de-water the resulting fiber fraction. It was not known, however, to employ a centrifugal separator after a screen bend in a starch separating process or how the liquid (containing starch and fine fibers) extracted from the fiber by a centrifugal separator could be effectively treated to separate the starch and fine fibers in order to recover the starch contained therein.

SUMMARY OF THE INVENTION

In summary, this invention provides a continuous process for separating starch particles and fibers from an aqueous slurry containing said particles and fibers suspended therein which comprises:

(1) Passing a supply stream of said slurry over a screen bend having a slot width of such dimensions that a separation of starch from fiber is effected to obtain a first fraction comprising an aqueous slurry containing a major portion of the starch particles and which is substantially free of fiber, and a second fraction comprising an aqueous slurry containing, in suspension, therein substantially all the fiber and a minor portion of the starch particles;

(2) Separating the second fraction into two components by centrifugally forcing said second fraction against a screen having openings of a dimension such that an aqueous component containing starch and fine fiber is separated from the fiber;

(3) Continuously recycling the aqueous component containing starch and fine fiber of step (2) to the supply stream of step (1);

(4) Recovering the first fraction of step (1) and the fiber separated in step (2).

The process of this invention is of particular interest because prior to this invention it would not have been obvious to one skilled in the art that the aqueous component of step (2) containing starch and fine fiber could be recycled to the screen bend. More particularly, since it was known that a screen bend employed to separate starch and fiber would pass substantially no fiber, recycling a slurry of starch and fine fiber to the screen could cause the fine fiber to be caught in a closed circuit resulting in a runaround of the fine fiber, i.e., the fine fiber in the aqueous component resulting from centrifugally screening the fiber, on recycling to the screen bend, would pass with the fiber overflow back to the centrifugal screen, and out again to the screen bend, and so on. Apparently, therefore, such recycling could result in a build-up of fine fiber in the system causing the system to become over-loaded and inoperable, or the fine fiber could run around in the system until the fiber was physically broken down to a particle size that would pass the screen bend thereby contaminating the starch.

While the above-mentioned problems were reasonably anticipated, it has been discovered that the process of this invention is very satisfactory. The process provides a starch product substantially uncontaminated by fiber in good yield, and a fiber product which is suitably de-watered.

BRIEF DESCRIPTION OF THE DRAWING

The drawing presents somewhat schematically an illustrative embodiment of the invention. The drawing will be discussed in more detail hereinafter.

DETAILED DESCRIPTION OF THE INVENTION AND ITS PREFERRED EMBODIMENTS

In its broad aspect, this invention provides a continuous process for separating starch particles and fiber from an aqueous slurry containing said particles and fibers suspended therein which comprises:

(1) Passing a supply stream of said slurry over a screen bend having a slot width of such dimensions that a separation of starch from fiber is effected to obtain a first fraction comprising an aqueous slurry containing a major portion of the starch particles and which is substantially free of fiber, and a second fraction comprising an aqueous slurry containing in suspension, therein substantially all the fiber and a minor portion of the starch particles;

(2) Separating the second fraction into two components by centrifugally forcing said second fraction against a screen having openings of a dimension such that an aqueous component containing starch and fine fiber is separated from the fiber;

(3) Continuously recycling the aqueous component containing starch and fine fiber of step (2) to the supply stream of step (1);

(4) Recovering the first fraction of step (1) and the fiber separated in step (2).

Aqueous slurries of starch particles and fibers useful in the process of this invention can be formed from a variety of starch bearing materials in any suitable manner. Various processes for forming such slurries are well known in the starch industry. Suitable starch bearing materials include corn, potato and cassava root. An aqueous slurry of starch and fiber particles particularly suitable for use in the process of this invention is one obtained from the wet milling of corn wherein the corn germ has been removed in a prior separation process.

The water content of the aqueous slurry preferably is such that an optimum separation is effected as the slurry is passed over the screen bend. The optimum water content will depend upon the materials and process conditions employed and can be readily determined in a routine manner. Generally, the aqueous slurry will preferably have a water content of from about 72% to 85% by weight.

The screen bend employed in the process of this invention is well known and is fully disclosed in U.S. Pat. 2,916,142, incorporated herein by reference. Screen bends with suitable slot widths for separating starch from fiber are known. The most suitable slot width is one which effects a good separation of starch from fiber while providing a good yield of starch. The most suitable slot widths for a particular starch-fiber slurry can be determined in a routine manner. Generally, a slot width of from about 40 to 75 microns will be employed to separate starch from fiber.

For example, producing starch from a process involving the wet milling of corn requires that an aqueous slurry of ground corn be separated into a fraction having a particle size of less than about 50 microns. The fraction bearing the less than about 50 microns material will contain starch granules, but will be substantially free of any fibrous material. A sharp separation at about 50 microns will result in a relatively pure final starch product. A screen bend having a slot width of about 50 microns is most useful in making such a separation.

Screen bends of various sizes and radii of curvature can be employed in the process of the invention. In a large volume industrial process a preferred screen bend is a commercially available 120° screen bend, 24 inches wide and 63 inches long.

The supply stream of the aqueous slurry of starch and fiber particles is introduced continuously to the screen bend tangentially in the manner conventionally employed at a pressure sufficient to wash the coarse separated solids over the screen. The most optimum pressure at which the supply stream is introduced to the screen bend will depend upon the composition of supply stream and can be determined in a routine manner. A supply pressure in the range of from about 15 p.s.i. to 75 p.s.i. can be very suitable. In a process involving the separation of corn starch and fibers, a supply pressure of from about 25 p.s.i. to 50 p.s.i. is preferred.

The coarse fibers washed over the screen bend can have a substantial water content, for example, from about 70% to 79% by weight water. As noted hereinbefore, it is desirable to partially de-water this material. In the process of this invention, this de-watering is accomplished by continuously centrifugally forcing this fiber material against a screen, preferably of the bar type, having openings of a size sufficiently large to suitably pass water and residual starch granules, but sufficiently small to prevent passage of the coarse fiber. Ideally, this centrifugal de-watering operation would result in the separation of only water and residual starch granules from the fiber, but this ideal separation is not practically attainable.

Various known centrifugal screening devices capable of continuously separating solids and liquids can be employed in the de-watering operation. Generally such devices comprise a cylindrical screen, preferably a bar screen means for imparting a centrifugal force to a slurry and means for removing separated solids from the screen. In a large volume industrial process, a commercially available centrifugal paddle screen has been found to be most suitable.

As will be recognized by those skilled in the art the optimum centrifugal force employed and the optimum screen opening size will vary depending upon various factors, including for example, the nature of the fiber overflow and water content. Generally, a suitable centrifugal force will be from about 18 g's to 200 g's, and suitable screens will have openings of from abut 50 microns to 75 microns. Screen openings larger than 50 microns, for example, up to 75 microns can desirably increase the rate and efficiency of the de-watering process generally without introducing an amount of fine fibers which are objectionable in the process of the invention.

Generally, it will be desirable to reduce the water content of the coarse fiber fraction to from about 60% to 68%, by weight, water, and preferably to from about 60% to 64%, by weight water.

The present invention may be better understood with reference to the accompanying drawing, wherein illustrative embodiments are shown somewhat schematically.

In the drawing there is shown a feed stream 9 and a holding tank 10 which contains the liquid slurry of fine particulate matter and coarse matter. The liquid slurry is passed along a conduit 11 with the aid of a pump 12 through a nozzle 13 into the screen bend 14. The screen bend comprises a housing 15 and a screening deck 16, over which the liquid slurry to be separated is supplied. The screening deck 16 is constructed of a plurality of bars 17 spaced apart so as to form a plurality of slits 18. The screening deck is curved so that the bars 17 from the generatrices of cylinder surface.

Fine particles and liquid pass through the separating apertures or slits 18 and collect in the receiving chamber 19 from which they are carried-off through exit port 20. The convex side of the screening deck 16 is entirely shut-in by the receiving chamber 19 so that no losses can occur.

Coarse particles move along the screening deck and upon reaching the delivery end of the deck, are carried into a collection reservoir 21. The coarse matter is then passed through the pipe 22 into a centrifugal paddle screen 23. The paddle screen generally comprises a housing 24, a cylindrical screen 25, and a plurality of paddles 26 rotatably mounted therein. The paddles are disposed on a drive shaft 27, which is powered by a suitable driving means 28. The overflow from the screen bend 14 is partially dewatered in the paddle screen 23 by forcing the water, as well as fine and some coarse particulate matter, through the screen 25. The major portion of the coarse material delivered to the paddle screen will not pass through the screen 25, but will be forced to exit through pipe 30. The fraction of material which does pass through the cylindrical screen 25 is collected in the reservoir 29 and is recycled to the feed stream of the screen bend, by passing it through a conduit 31 with the aid of a pump 32 into the feed stream reservoir 10.

In operation, as the liquid slurry flows along a tangential path to be screening deck 16, a thin layer of the slurry is scraped-off on each of the bads from the current of suspension. As can be deducted from the results, the thickness of said layer normally amounts to about one-fourth of the width of the slit between two bars. A solid particle which is at least half immersed in said layer will be entrained and passed through the slit. The biggest particle that can get into such a slit would, therefore, have a diameter of twice the thickness of the scraped-off layers, which implies that this diameter is normally equal to about one-half the width of the slit.

The process of the present invention is further illustrated in the following example, wherein one embodiment of the invention is set forth and which is not to be construed as limiting the invention thereto.

EXAMPLE

In this example, two 1200° screen bends 24 inches wide and 63 inches long and having slot widths of 50 microns were employed in parallel.

An aqueous slurry of a starch fiber stream obtained from milling steeped corn and having a water content of about 74% by weight was introduced to the screen bends at 30 p.s.i. and was passed over the screen bends at a rate of about 260 gallons per minute (including recycle). The slurry was thereby separated into two fractions. The first fraction, consisting of the portion of the slurry passing through the screening deck, contained 16 grains of material having a particle size greater than 43 microns and was collected at a rate of 149 gallons per minute at a Baumé between about 11 and 12. The second fraction, consisting of the overflow from the screen deck and which contained the fiber portion of the slurry as well as residual starch, was continuously passed at a rate of 111 gallons per minute into a centrifugal paddle screen (Indiana Finisher manufactured by Indiana Canning Machinery Co.). The centrifugal paddle screen was equipped with a bar screen having slot width of 50 microns, and operated at a rate of 900 r.p.m.s forcing the fiber against the screen with a force of 162 g's. The fiber fraction from the overflow of the screen bend was thereby separated into two components. The first component separated at a rate of 65 gallons per minute containing 20 ounces per gallon starch and 283 grains per gallon fiber fines, i.e., particles having a size of from about 43 microns to 105 microns which passed through the screen of the paddle screen, was recycled into the feed stream going to the screen bend. The second component comprising de-watered fiber from the original slurry was collected at a rate of 46 gallons per minute at a moisture content of about 62 percent by weight.

The process was continuously operated providing an excellent separation of starch and fiber.

The efficiency of the present process in separating starch from fiber, while simultaneously dewatering the fiber to a relatively low water content, was demonstrated in an experiment wherein the starch-fiber separation effected in both a screen bend and a paddle screen alone, was compared to a starch-fiber separation effected by the process of this invention. In this experiment, a separation at 50 microns was carried out. The efficiency of the separation was determined by measuring the amount of material having a particle size greater than 43 microns in the starch stream and by measuring the water content of the fiber stream. In the first part of this experiment, wherein the separation was effected by using only a screen bend, a starch-fiber mixture having a water content of 74% was fed into a screen bend and a starch and fiber stream were recovered. Upon analysis, the starch stream was found to contain between 7 and 8 grains per gallon of material having a particle size greater than 43 mcirons. The fiber stream was found to have a water content of about 75% by weight.

A similar aqueous suspension of starch and fiber, having a water content of 74% by weight, was fed into a paddle screen to effect the separation of starch from fiber. In this separation of starch stream was found to contain 150 grains per gallon of material having a particle size in excess of 43 microns. The fiber stream from the separation had a water content of 65% by weight.

An aqueous suspension of starch and fiber, as used in the above-described separations, having a water content of 74% by weight, was used in a procedure wherein both a screen bend and a paddle screen were utilized in accordance with the process of this invention to effect the separation of starch and fiber. In this experiment, the starch stream recovered from the screen bend contained 16 grains per gallon of material having a particle size in excess of 43 microns and the fiber stream collected from the paddle screen had a water content of 62% by weight.

It can be seen from the above-detailed procedure, that a separation of starch and fiber can be readily effected, wherein the starch stream is substantially free of fibrous material and wherein the fiber stream has been dewatered to a relatively low moisture content. It must be noted that while the difference in water content of the fiber leaving the screen bend alone and the water content of the fiber leaving the paddle screen used alone or in accordance with the present invention seems insignificant, a reduction in moisture content of 13% within this range results in a drastic reduction of fluidity of the product. Thus, a fiber slurry having a water content of 75% by weight is a free-flowing aqueous suspension, whereas the same fiber having a water content of below 65% by weight is a particulate mass having a dewatered appearance.

While the invention has been described in connection with specific embodiments thereof, it will be understood that it is capable of further modifications, and this application is intended to cover any variations, uses, or adaptations of the inventions of the invention following, in general, the principles of the invention and including such departures from the present disclosure as come within in known or customary practice in the art to which the invention pertains, and as may be applied to the essential features hereinbefore set forth, and as fall within the scope of the invention.

What is claimed is:

1. A continuous process for separating starch particles and fibers from an aqueous slurry containing said particles and fibers suspended therein which comprises:
   (1) passing a supply stream of said slurry over a screen bend having a slot width of such dimensions that a separation of starch from fiber is effected to obtain a first fraction comprising an aqueous slurry containing a major portion of the starch particles and which is substantially free of fiber, and a second fraction comprising an aqueous slurry containing in suspension, therein substantially all the fiber and a minor portion of the starch particles;
   (2) separating the second fraction into two components by centrifugally forcing said second fraction against a screen having openings of a dimension such that an aqueous component containing starch and fine fiber is separated from the fiber;
   (3) continuously recycling the aqueous component containing starch and fine fiber of step (2) to the supply stream of step (1);
   (4) recovering the first fraction of step (1) and the fiber separated in step (2).

2. The process of claim 1 wherein the aqueous slurry of from about 72% to 85%, by weight, is water.

3. The process of claim 2 wherein the screen bend has slot width dimensions of from about 50 microns to 75 microns.

4. The process of claim 3 wherein the screen of step (2) has opening of from about 50 microns to 75 microns.

5. The process of claim 4 wherein the screen of step (2) is a bar screen.

6. The process of claim 5 wherein the second fraction is centrifugally forced against the screen at from about 18 g's to 200 g's.

7. The process of claim 6 wherein the fiber component separated in step (2) has a water content of from about 60% to 68%, by weight.

8. The process of claim 7 wherein the starch particles and fiber to be separated are wet milled corn.

References Cited
UNITED STATES PATENTS

| | | | |
|---|---|---|---|
| 2,916,142 | 12/1959 | Fontein | 209—274 |
| 2,974,068 | 3/1961 | Fontein | 127—67 |
| 2,995,246 | 8/1961 | Titelboon | 209—281 X |
| 3,008,574 | 11/1961 | Clawson | 209—12 |
| 3,079,283 | 2/1963 | Dreissen | 127—25 X |
| 3,446,665 | 5/1969 | Castiello | 127—67 |
| 3,537,656 | 11/1970 | Henne | 209—17 X |

FOREIGN PATENTS

| | | | |
|---|---|---|---|
| 211,758 | 3/1960 | Austria | 209—274 |
| 546,647 | 4/1956 | Belgium | 209—305 |

ROBERT HALPER, Primary Examiner

U.S. Cl. X.R.

209—234, 270, 274